United States Patent
Xiao

(10) Patent No.: US 10,931,610 B2
(45) Date of Patent: Feb. 23, 2021

(54) METHOD, DEVICE, USER TERMINAL AND ELECTRONIC DEVICE FOR SHARING ONLINE IMAGE

(71) Applicant: Alibaba Group Holding Limited, Grand Cayman (KY)

(72) Inventor: Meishun Xiao, Guangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 13 days.

(21) Appl. No.: 15/872,018

(22) Filed: Jan. 16, 2018

(65) Prior Publication Data
US 2018/0205680 A1    Jul. 19, 2018

(30) Foreign Application Priority Data

Jan. 16, 2017   (CN) .......................... 201710029397.0

(51) Int. Cl.
| | |
|---|---|
| *H04L 12/58* | (2006.01) |
| *G06T 11/60* | (2006.01) |
| *H04L 29/08* | (2006.01) |
| *H04L 9/32* | (2006.01) |
| *H04L 9/06* | (2006.01) |

(52) U.S. Cl.
CPC .............. *H04L 51/08* (2013.01); *G06T 11/60* (2013.01); *H04L 9/3239* (2013.01); *H04L 67/06* (2013.01); *G06T 2200/24* (2013.01); *H04L 9/0643* (2013.01); *H04L 51/32* (2013.01); *H04L 67/02* (2013.01); *H04L 67/2842* (2013.01)

(58) Field of Classification Search
None
See application file for complete search history.

(56) References Cited

U.S. PATENT DOCUMENTS

| | | | |
|---|---|---|---|
| 6,363,418 B1 * | 3/2002 | Conboy .............. | G06F 16/9574 709/218 |
| 9,317,807 B1 * | 4/2016 | Staddon ................... | G06N 5/04 |
| 9,390,472 B2 * | 7/2016 | Citrin ................. | H04N 1/00506 |
| 9,396,354 B1 * | 7/2016 | Murphy .................. | H04L 9/088 |
| 9,667,694 B1 * | 5/2017 | Wagner ................. | H04L 67/325 |
| 10,057,204 B2 * | 8/2018 | Miller ...................... | H04L 51/36 |
| 10,120,530 B2 * | 11/2018 | Snibbe .................. | G06F 3/0488 |
| 10,262,150 B2 * | 4/2019 | Tessman, Jr. ........... | G06F 21/31 |
| 2002/0135801 A1 * | 9/2002 | Tessman, Jr. ........... | G06F 21/31 358/1.15 |
| 2003/0028543 A1 * | 2/2003 | Dusberger .............. | G06F 16/50 |

(Continued)

OTHER PUBLICATIONS

U.S. Appl. No. 09/920,070 Drawings corresponding to US 2003/0028543, pg. 1-11 (Year: 2001).*

*Primary Examiner* — Backhean Tiv
(74) *Attorney, Agent, or Firm* — Alston & Bird LLP

(57) ABSTRACT

The present invention discloses a method, a device, a user terminal and an electronic device for sharing an online image. The method includes: in response to a user's request for sharing an online image, obtaining a local resource of the online image to be shared; generating a sharing setting interface for the user to set editing the image and then sharing the online image, or directly sharing the online image. According to the present invention, a user is allowed to directly edit an online image and then share it with other users without the need of certain cumbersome operations, so as to enhance the user experience.

12 Claims, 3 Drawing Sheets

(56) References Cited

U.S. PATENT DOCUMENTS

| | | | |
|---|---|---|---|
| 2003/0028662 A1* | 2/2003 | Rowley | H04L 67/14 709/231 |
| 2005/0010580 A1* | 1/2005 | Lancefield | G06F 16/289 |
| 2007/0157105 A1* | 7/2007 | Owens | G06F 3/04842 715/771 |
| 2007/0260979 A1* | 11/2007 | Hertzfeld | G06T 11/60 715/209 |
| 2008/0024629 A1* | 1/2008 | Kotani | H04N 5/3675 348/241 |
| 2008/0225057 A1* | 9/2008 | Hertzfeld | G06F 16/583 345/619 |
| 2009/0248692 A1* | 10/2009 | Tsukagoshi | H04L 65/403 |
| 2009/0292762 A1* | 11/2009 | Mettala | G06Q 30/02 709/203 |
| 2010/0013757 A1* | 1/2010 | Ogikubo | G06F 16/745 345/156 |
| 2010/0056188 A1* | 3/2010 | Super | H04M 1/72555 455/466 |
| 2011/0064281 A1* | 3/2011 | Chan | G06Q 50/01 382/118 |
| 2011/0145327 A1* | 6/2011 | Stewart | G06F 16/58 709/203 |
| 2012/0094721 A1* | 4/2012 | Brondmo | H04W 4/08 455/566 |
| 2012/0249550 A1* | 10/2012 | Akeley | H04N 5/232 345/419 |
| 2013/0135455 A1* | 5/2013 | Hjelm | G06Q 30/0261 348/77 |
| 2013/0194438 A1* | 8/2013 | Sweet, III | G06F 3/005 348/207.1 |
| 2013/0203353 A1* | 8/2013 | Kim | H04B 7/24 455/41.2 |
| 2013/0205219 A1* | 8/2013 | Moha | G06F 3/04842 715/748 |
| 2013/0239003 A1* | 9/2013 | Usenko | H04N 1/00411 715/733 |
| 2013/0311947 A1* | 11/2013 | Tsai | G09B 5/10 715/815 |
| 2013/0332856 A1* | 12/2013 | Sanders | G06F 3/0481 715/753 |
| 2014/0012671 A1* | 1/2014 | Ye | G06Q 30/0251 705/14.54 |
| 2014/0018053 A1* | 1/2014 | Cho | G06F 3/0488 455/418 |
| 2014/0040764 A1* | 2/2014 | Stoop | G06F 3/0484 715/748 |
| 2014/0050419 A1* | 2/2014 | Lerios | G06T 3/0056 382/276 |
| 2014/0059461 A1* | 2/2014 | Kim | G11B 27/34 715/769 |
| 2014/0075335 A1* | 3/2014 | Hicks | G06Q 10/10 715/753 |
| 2014/0139700 A1* | 5/2014 | Sato | H04N 5/23222 348/222.1 |
| 2014/0250126 A1* | 9/2014 | Baldwin | G06F 16/51 707/737 |
| 2015/0009152 A1* | 1/2015 | Tang | G06F 3/0484 345/173 |
| 2015/0009391 A1* | 1/2015 | Kim | G06F 3/04845 348/333.05 |
| 2015/0123988 A1* | 5/2015 | Ohmori | G06F 3/03545 345/594 |
| 2015/0142884 A1* | 5/2015 | Veramendi | G06F 16/51 709/204 |
| 2015/0156149 A1* | 6/2015 | Keith | H04L 51/08 709/206 |
| 2015/0244794 A1* | 8/2015 | Poletto | G06F 16/285 715/748 |
| 2015/0293672 A1* | 10/2015 | Crotty | G06T 11/60 715/255 |
| 2015/0356615 A1* | 12/2015 | Hagen | G06Q 30/0267 705/14.64 |
| 2015/0370428 A1* | 12/2015 | Chan | G06F 3/04842 715/739 |
| 2016/0006927 A1* | 1/2016 | Sehn | H04N 5/23229 348/207.1 |
| 2016/0093020 A1* | 3/2016 | Basalamah | H04N 5/2624 345/634 |
| 2016/0099901 A1* | 4/2016 | Allen | G06F 3/0482 709/206 |
| 2016/0110906 A1* | 4/2016 | Ahuja | G06F 3/04817 345/634 |
| 2016/0125573 A1* | 5/2016 | Takayama | G06K 9/32 382/299 |
| 2016/0173615 A1* | 6/2016 | Pattan | H04L 63/102 709/225 |
| 2016/0267576 A1* | 9/2016 | Crossman Sullivan | G06Q 30/0601 |
| 2016/0337291 A1* | 11/2016 | Park | H04L 51/32 |
| 2016/0350953 A1* | 12/2016 | Mittelstaedt | G06T 11/60 |
| 2017/0034443 A1* | 2/2017 | Kwon | G06F 3/04842 |
| 2017/0041569 A1* | 2/2017 | Perrot | G11B 27/3027 |
| 2017/0060966 A1* | 3/2017 | Glover | G06F 16/248 |
| 2017/0091224 A1* | 3/2017 | Shioya | G06F 16/5854 |
| 2017/0142045 A1* | 5/2017 | Chakra | G06F 16/972 |
| 2017/0185254 A1* | 6/2017 | Zeng | G06F 3/0482 |
| 2017/0262139 A1* | 9/2017 | Patel | G06F 40/169 |
| 2017/0263029 A1* | 9/2017 | Yan | G06F 3/04845 |
| 2017/0289234 A1* | 10/2017 | Andreou | G06F 3/04845 |
| 2017/0336926 A1* | 11/2017 | Chaudhri | G06F 3/04883 |
| 2017/0344246 A1* | 11/2017 | Burfitt | G06Q 10/10 |
| 2018/0108111 A1* | 4/2018 | Zhu | G06F 9/44 |
| 2018/0121065 A1* | 5/2018 | Seo | G06F 3/04845 |
| 2018/0121234 A1* | 5/2018 | Lin | G06F 9/485 |
| 2018/0139166 A1* | 5/2018 | Dimson | G06F 16/435 |
| 2018/0143748 A1* | 5/2018 | Ahmed | H04N 21/4312 |
| 2018/0174190 A1* | 6/2018 | Ferreira | G06Q 30/0246 |
| 2018/0188916 A1* | 7/2018 | Lyons | H04N 21/23418 |
| 2018/0189074 A1* | 7/2018 | Kulkarni | G06F 9/451 |
| 2018/0205680 A1* | 7/2018 | Xiao | H04L 51/08 |
| 2018/0332233 A1* | 11/2018 | Lee | G06F 16/904 |

* cited by examiner

US 10,931,610 B2

METHOD, DEVICE, USER TERMINAL AND ELECTRONIC DEVICE FOR SHARING ONLINE IMAGE

CROSS-REFERENCE TO RELATED APPLICATION

The present invention claims priority to and benefit of Chinese Patent Application No. 201710029397.0, filed with the State Intellectual Property Office (SIPO) of the People's Republic of China on Jan. 16, 2017, the entire content of which is incorporated by reference into the present application.

TECHNICAL FIELD

The present invention related to the field of Internet technology; and more specifically, it relates to a method, a device, a user terminal and an electronic device for sharing an online image.

BACKGROUND ART

With the rapid development of Internet technology and the increasing popularity of intelligent electronic equipment, online image sharing service has become a common service for many Internet applications (such as browsers, browser-enabled applications, and the like) with an online image viewing function, so as to improve the user experience.

However, the current online image sharing services only allow a user to directly share an online image with other users. In this case, if a user wants to editing an online image prior to sharing it, for example, when a user sees an interesting image when viewing a web page and wants to edit it (for example, crop, adjust the hue, add a customized icon, add a text label, and so on) and then share the edited image with other users through social software, the user is not able to directly edit the image through the browser and then share the edited image; rather, the user needs to download the image through the browser and save the image in the memory of a local device, and subsequently use image processing software to edit the image, and then save the edited image into the memory of the local device, next share the edited image with other users through social software. As a result, a user needs to perform many cumbersome procedures to edit the picture and then share the edited image with other users, which significantly comprises the user experience.

Therefore, the inventor of the present invention believes that it is necessary to make improvements to solve the problems existing in the prior art.

SUMMARY OF INVENTION

One object of the present invention is to provide a new technical solution for sharing an online image.

According to the first aspect of the present invention, a method for sharing an online image is provided, the method comprises:

in response to a user's request for sharing an online image, obtaining a local resource of the online image to be shared;

generating a sharing setting interface for the user to set editing the image and then sharing the online image, or directly sharing the online image.

Optionally, the method for sharing an online image further comprises:

when the user sharing the online image after setting editing, generating an image editing interface for the user to enter an editing instruction;

in response to the user's editing instruction, editing on the basis of the local resource of the online image, so as to generate a corresponding image for sharing by the user.

Optionally, the step of obtaining a local resource of the online image to be shared comprises:

obtaining a unique image identifier of the online image;

querying in a local cache according to the unique image identifier to obtain the local resource of the online image.

Further optional, the step of obtaining a local resource of the online image to be shared further comprises:

in the case that the local resource of the online image is not found in the local cache, obtaining a network resource of the online image, and then saving the network resource in the local cache to be a corresponding local resource thereof.

Further optional, the step of obtaining a unique image identifier of the online image comprises:

treating with a predetermined encryption algorithm according to the attribute information of the online image, so as to generate the unique image identifier of the online image.

Optionally, the attribute information of the online image is the URL of the online image;

the predetermined encryption algorithm is a MD5 algorithm.

According to the second aspect of the present invention, a device for sharing an online image is provided, the device comprises:

a resource obtaining unit, which is configured for, in response to a user's request for sharing an online image, obtaining a local resource of the online image to be shared;

a sharing interface generating unit, which is configured for generating a sharing setting interface for the user to set editing the image and then sharing the online image, or directly sharing the online image.

Optionally, the device for sharing an online image further comprises:

an editing interface generating unit, which is configured for, when the user sharing the online image after setting editing, generating an image editing interface for the user to enter an editing instruction;

an image editing unit, which is configured for, in response to the user's editing instruction, editing on the basis of the local resource of the online image, so as to generate a corresponding image for sharing by the user.

According to the third aspect of the present invention, a user terminal is provided, and the user terminal comprises at least the device for sharing an image according to the second aspect of the present invention.

According to the fourth aspect of the present invention, an electronic device is provided, and the electronic device comprises a processor and a memory, wherein the memory is configured for storing instructions, and the instructions are used for controlling the processor to operate, so as to execute the method for sharing an image provided in the first aspect of the present invention.

The inventor of the present invention has found that there is no such a method, a device, a user terminal and an electronic device in the prior art, which is able to provide a user with a service that allows the user to edit an online image and then share the edited image on the basis of a local resource of the online image by way of obtaining the local resource of the online image. In this way, a user is allowed to directly edit an online image and then share it with other users without the need of certain cumbersome operations, so as to enhance the user experience. Therefore, the technical task to be finished or the technical problem to be solved by the present invention is never thought of or anticipated by those skilled in the art, so the present invention is a new technical solution.

Further features of the present invention, as well as advantages thereof, will become apparent from the following detailed description of exemplary embodiments of the present invention with reference to the accompanying drawings.

BRIEF DESCRIPTION OF DRAWINGS

The accompanying drawings, which are incorporated in and constitute a part of the description, illustrate certain embodiments of the present invention and, together with the description, serve to explain the principles of the invention.

DESCRIPTION OF EMBODIMENTS

Various exemplary embodiments of the present invention will be described in detail with reference to the accompanying drawings. It should be noted that the relative arrangement of the components and steps, numerical expressions and numerical values set forth in these embodiments do not limit the scope of the present invention unless it is specifically stated otherwise.

The following description of at least one exemplary embodiment of the present invention is merely illustrative in nature and by no means is to be construed as a limitation to the invention and the application or use thereof.

Techniques, methods, and devices known to one of ordinary skill in the relevant art may not be discussed in detail but, where appropriate, the techniques, methods, and devices should be considered part of the description.

In all of the examples shown and discussed herein, any specific value should be interpreted as merely illustrative and not as a limitation. Therefore, other examples of the exemplary embodiments may have different values.

It should be noted that similar reference numbers and letters designate similar terms in the following figures, and therefore, an item need not be further discussed in subsequent figures as long as that item is defined in a drawing.

<Hardware Configuration>

Figure 1:
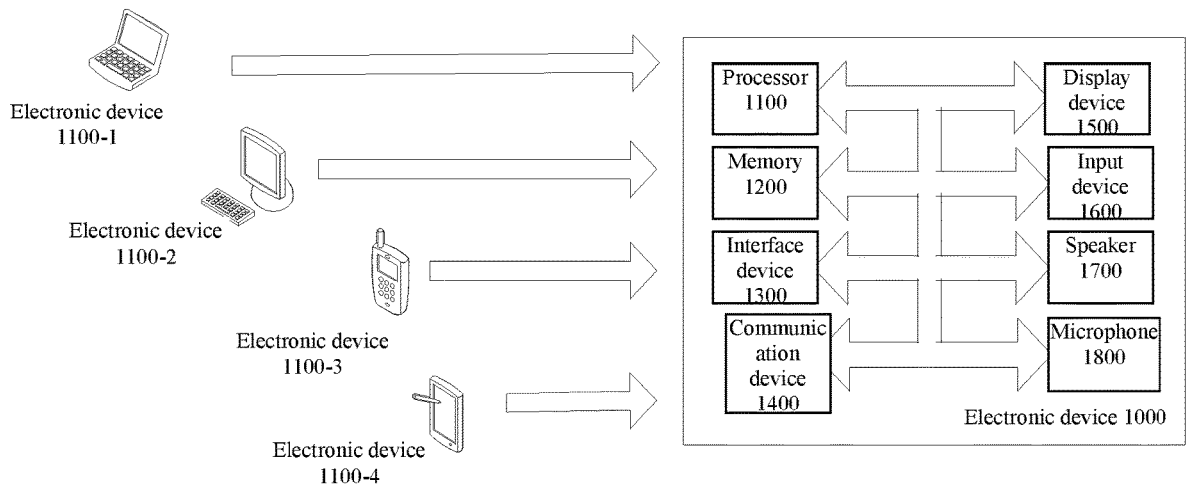
FIG. 1 is a block diagram showing an example of a hardware configuration of an electronic device that can be used to implement one or more embodiments of the present invention.

FIG. 1 is a block diagram showing the hardware configuration of an electronic device 1000 that can implement one or more embodiments of the present invention.

The electronic device 1000 can be a portable computer (1000-1), a desktop computer (1000-2), a cell phone (1000-3), a tablet computer (1000-4), or the like. As shown in FIG. 1, the electronic device 1000 may include a processor 1100, a memory 1200, an interface device 1300, a communication device 1400, a display device 1500, an input device 1600, a speaker 1700, a microphone 1800, and so on. Among the foregoing devices, the processor 1100 may be a central processing unit CPU, a microprocessor MCU, or the like. The memory 1200 includes, for example, a ROM (Read Only Memory), a RAM (Random Access Memory), a non-volatile memory such as a hard disk, and the like. The interface device 1300 includes, for example, a USB interface, a headphone jack, and the like. The communication device 1400, for example, can perform wired or wireless communications. The display device 1500 is, for example, a liquid crystal display, a touch display, or the like. The input device 1600 may include, for example, a touch screen, a keyboard, a body sensation input, and the like. In addition, a user can input/output voice information through the speaker 1700 and the microphone 1800.

The electronic device shown in FIG. 1 is merely illustrative and in no way intended to limit the present invention, the application or use thereof. In one or more embodiments of the present invention, the memory 1200 of the electronic device 1000 is configured to store instructions for controlling the processor 1100 to operate so as to execute any one of the online image sharing methods provided by one or more embodiments of the present invention. Those skilled in the art should understand that although a plurality of devices are shown in FIG. 1 for the electronic device 1000, the present disclosure may involve only some of the devices therein. For example, the electronic device 1000 may only relate to the processor 1100 and the storage device 1200. A person of ordinary skill in the art is able to design the instructions according to the disclosed solution of the present invention. In addition, how the instructions control the processor to operate is well known in the art, and will not be described in detail herein.

Example

Embodiment

Figure 2:
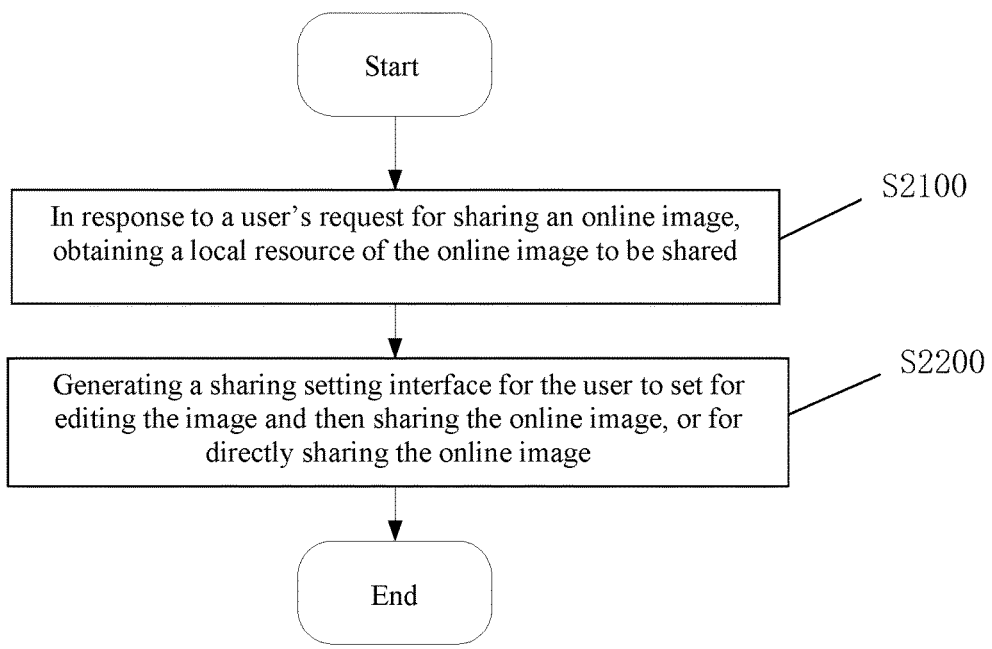
FIG. 2 is a flow chart of a method for sharing an online image according to one or more embodiments of the present invention.

In this embodiment, a method for sharing an online image is provided. As shown in FIG. 2, the method includes the following steps:

Step S2100: in response to a user's request for sharing an online image, obtaining a local resource of the online image to be shared.

Where, an online picture is an image that a user views through the Internet with an Internet application (for example, a browser, a browser-enabled application) having an image browsing function, for example, an image presented in a web page.

When seeing an online image of interest, a user may want to share the image with other users. Accordingly, the user may click on the image or select the image so as to trigger a request for sharing the online image. In an example, for an online image of interest shown on a touch screen display, a user may trigger a request for sharing the online image by long pressing the online image.

Currently, in the prior art, for an online image sharing request triggered by a user, the corresponding online image is usually directly shared to other users whom the user wants to share through a social application (for examples, Weibo, Myspace, WeChat) selected by the user. More specifically, for example, the URL (Uniform Resource Locator) of the corresponding online image is shared with other users through a social application.

Nevertheless, in one or more embodiments of the present application, in response to a user's request for sharing an online image, a local resource of the online image to be shared is obtained, in which the local resource is an image resource actually corresponding to the online image. In this way, in the subsequent steps of the method for sharing an online image according to this embodiment of the present invention, a service of editing and sharing an online image can be provided to the user based on the local resource of the online image, so that the user can directly edit the online image and share the edited image with other users without cumbersome operation, thereby improving the user experience.

More specifically, the step of obtaining a local resource of the online image to be shared includes:

obtaining a unique image identifier of the online image;

querying in a local cache according to the unique image identifier to obtain the local resource of the online image.

In the foregoing process, the local cache at least includes a system cache corresponding to a device that implements the method for sharing online picture provided in this embodiment. In addition, an application cache of an Internet application that provides a browsing service of the online image may also be included.

The inventor of the present invention finds that when a user browses an online image in real time through an internet application, the online application actually caches the online image in a real time manner. Accordingly, a user may obtain the URL of the online image as the unique image identifier, and then according to the URL of the online image, queries from the application cache so as to obtain the local resource of the online image.

However, in practice, the application is usually triggered to clear the application cache according to the Internet application's own memory management mechanism or the user's memory management requirement. As a result, the local resource of the online image cannot be obtained from the application cache.

In this embodiment, a mechanism for storing an online image in the system cache is provided, and the stored online images are all indexed with a unique image identifier thereof, so that in the step when a local resource of an online image to be shared needs to be obtained, the system cache is queried according to the unique picture identifier, so as to obtain the local resource of the online image.

The unique picture identifier can be a URL. However, since the URLs are usually quite long and have many characters, the efficiency of searching the local resource of an online image in the system cache according to the URL thereof is usually undesirable. Therefore, in one example, the attribute information of the online image can be used to generates a unique image identifier of the online image as an index by using a predetermined encryption algorithm, in which the attribute information of the online image may be a resource identifier, a name, a source, and the like of the online image, and may be, for example, a URL of the online image; on the other hand, the predetermined encryption algorithm may be various algorithms that allow the attribute information of the online image to have a unique result value after being encrypted, for example, it can be an MD5 algorithm (Message-Digest Algorithm 5). Processing the URL of an online image with the MD5 algorithm can generate a unique result value as a unique image identifier of the online image, so as to improve the efficiency of obtaining the local resource of an online image in the system cache according to a unique image identifier.

Correspondingly, in this embodiment, when obtaining the local resource of an online image to be shared in response to the online image sharing request of the user, the unique image identifier of the online image needs to be obtained first, and the unique image identifier of the online image can be obtained according to the attribute information of the online image through a predetermined encryption algorithm to generate a corresponding unique image identifier. According to the unique picture identifier, when there is an image resource with the same unique image identifier in the local cache, it indicates that the foregoing image resource is the local resource of the corresponding online picture. In practice, some abnormalities may cause some or all of the stored resources in the local cache to be lost.

Thus, in this embodiment, the step of obtaining the local resource of an online picture to be shared further includes: acquiring the network resource of the online picture when the local resource of the online picture is not found in the local cache, and then storing it in the local cache as the corresponding local resource.

In this case, when the obtained network resource of the online image is directly used as the local resource of the online image obtained in response to the online image sharing request, and at the same time, the online resource of the online image is stored in the local cache as a corresponding local resource, the attribute information of the online image can be used to generate a unique image identifier of the online image as an index through a predetermined encryption algorithm so as to ensure that the local image of the online image can be queried from the local cache by using the unique image identifier when responding to the request of sharing the online image next time.

After obtaining the local resource of the online image, the process proceeds to step S2200 to generate a sharing setting interface for the user to set editing the image and then sharing the online image after editing, or directly sharing the online image.

The sharing setting interface may add two buttons, for example, "creative sharing" and "picture sharing", for the user to click with the online pictures to be shared as the background thereof. In this way, when the user clicks the button of "creative sharing", correspondingly the user first sets editing the online image to be shared and then share the edited image; and when the user clicks the button "share image', correspondingly the user sets directly sharing the online image.

Further, the method for sharing an online image provided in this embodiment of the present invention also includes:

when the user sharing the online image after setting editing, generating an image editing interface for the user to enter an editing instruction;

in response to the user's editing instruction, editing on the basis of the local resource of the online image, so as to generate a corresponding image for sharing by the user.

The image editing interface is based on the image to be shared and to provide the user with an interface for inputting editing commands such as cropping, adjusting hue, blurring, mosaics, adding personalized icons, and adding personalized tags. The editing instructions can be selected by the user through touching the screen or entering through other input devices.

After the user inputs the editing instruction, the local resource of the online image is edited in response to the editing instruction, an edited image of the online image to be shared is thus generated, and the social network application specified by the user can then be called to share the edited image with other users, so that the user does not need to perform a series of cumbersome procedures, such as storing the online image, using image processing software to edit the stored online image, storing the edited image, and then using a social network application to share the edited image, and so on. The user is allowed to directly edit the online image viewed when browsing a network and share the edited image to other users, so as to enhance the user experience.

Embodiment

The method for sharing an online image provided in this embodiment will be further illustrated next with reference to FIG. 3. In this example, the user generates an online image sharing request by long pressing the online image to be shared, and the method includes the following steps:

Step S301, it is detected in real time whether the user presses the online picture for a long time. If yes, it is determined that the user triggers an online image sharing request, and the procedure goes to step S302. Otherwise, the procedure ends.

Step S302, a local resource of an online image is obtained by a user from an application cache of an Internet application used by the user for browsing an online image. For example, a local resource of an online image is queried and obtained from an application cache according to a unique picture identifier, such as a URL, of the online image. If the local resource of the online image can be obtained, goes to step S306; otherwise, goes to step S303.

Step S303: obtain, from the system cache, the local resource of the online image, for example, a unique result value is obtained by performing an encryption process according to the URL of the online image by using the MD5 algorithm, which is used as an index to query and obtain the local resource with the same index in the system cache, if the local resource of the online image can be obtained, goes to step S306; otherwise, goes to step S304.

Step S304: obtain a network resource of the online image as the local resource of the online image, and store the network resource in a local cache as the local resource corresponding to the online image for use in response to a future request for sharing the same online image.

Step S305: after obtaining the local resource of the online image, a sharing setting interface is generated and presented to the user. In this example, two buttons for the user to click on, such as "creative sharing" and "image sharing" are provided, which use the online image to be shared as the background, when the user clicks the "creative sharing" button, correspondingly the user sets to edit the online image first and then share the edited image with other users; while when the user clicks the "image sharing" button, correspondingly the user directly shares the online image with other users.

Step S306: determine whether the user selects "creative sharing', if yes, goes to Step S307; otherwise, goes to S308.

Step S307, generate an editing interface for the user to input an editing instruction and then edit the image based on the local resource of the online image according to the editing instruction from the user so as to generate a corresponding image to be shared, next, use a social network application specified by the user to share the generated image with other users.

Step S308, in the case that the user does not select "creative sharing', directly use a social network application specified by the user to share the online image with other users.

<Device>

In this embodiment, a device for sharing an online image 4000 is further provided. As shown in FIG. 4, the online image sharing device 4000 includes a resource obtaining unit 4100 and a sharing interface generating unit 4200. Optionally, the online image sharing device 4000 may further include an editing interface generating unit 4300 and an image editing unit 4400, which are respectively used to implement the method for sharing an online image as shown in FIG. 2 or FIG. 3 provided in one or more embodiments of the present invention, and the related details will not be described herein again.

The device for sharing an online image 4000 includes:

a resource obtaining unit 4100, which is configured for, in response to a user's request for sharing an online image, obtaining a local resource of the online image to be shared;

a sharing interface generating unit 4200, which is configured for generating a sharing setting interface for the user to set editing the image and then sharing the online image, or directly sharing the online image.

Optionally, the device for sharing an online image further includes:

an editing interface generating unit 4300, which is configured for, when the user sharing the online image after setting editing, generating an image editing interface for the user to enter an editing instruction;

an image editing unit 4400, which is configured for, in response to the user's editing instruction, editing on the basis of the local resource of the online image, so as to generate a corresponding image for sharing by the user.

In this embodiment, the device for sharing an online image may have a plurality of physical forms. For example, the device for sharing an online image 4000 may be a built-in function unit of an Internet application with an online image browsing function, or may be a plug-in that can be coupled to an Internet application via a pre-determined interface to provide the function of image sharing.

<User Terminal>

In this embodiment, a user terminal is also provided, which at least includes the device for sharing an online image 4000. Specifically, the user terminal may be any user terminal of an Internet application with an online image browsing function, for example, the user terminal of the browser.

<Electronic Device>

Figure 3:
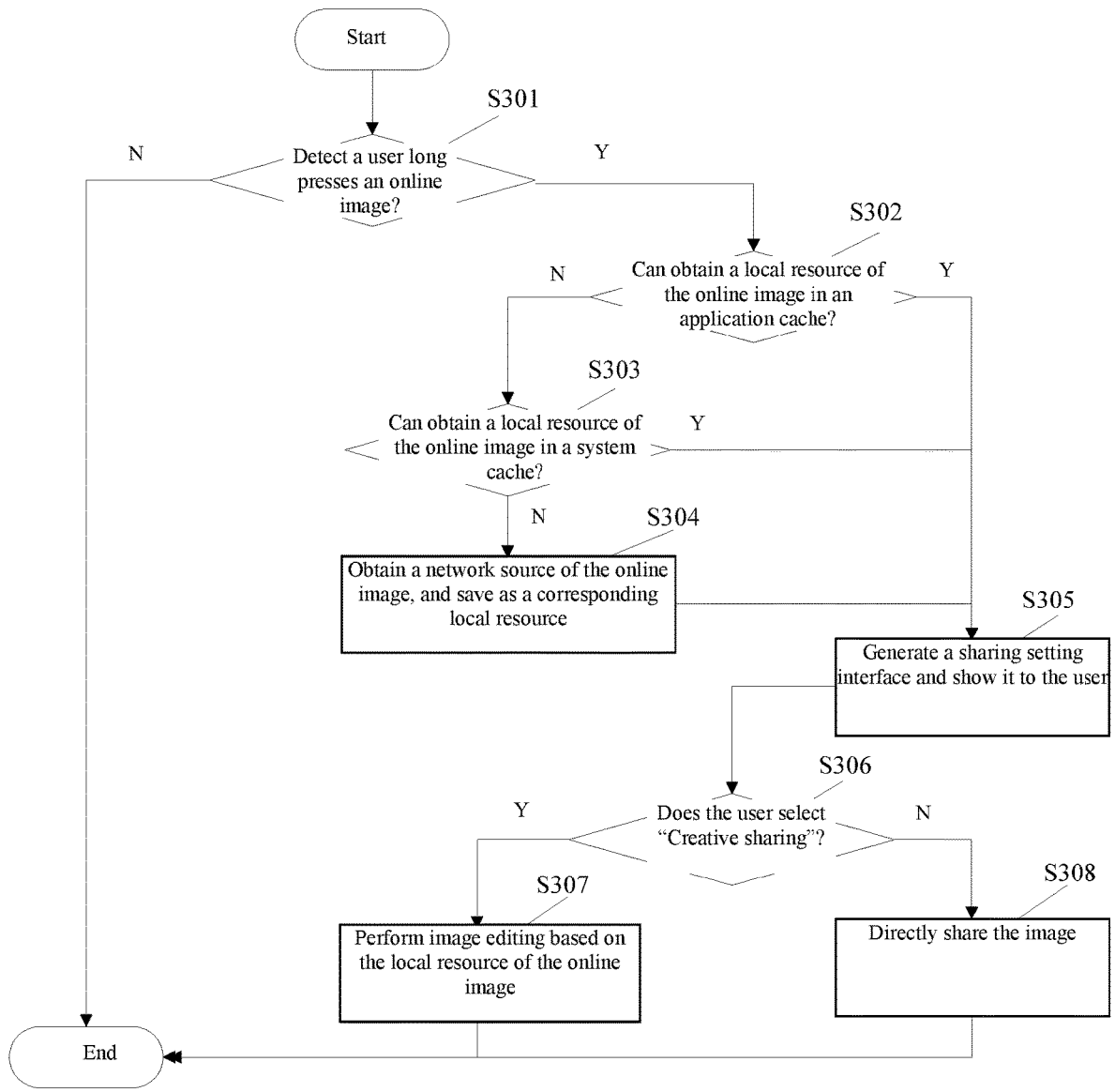
FIG. 3 is a schematic view of an example of a method for sharing an online image according to one or more embodiments of the present invention.
Figure 4:
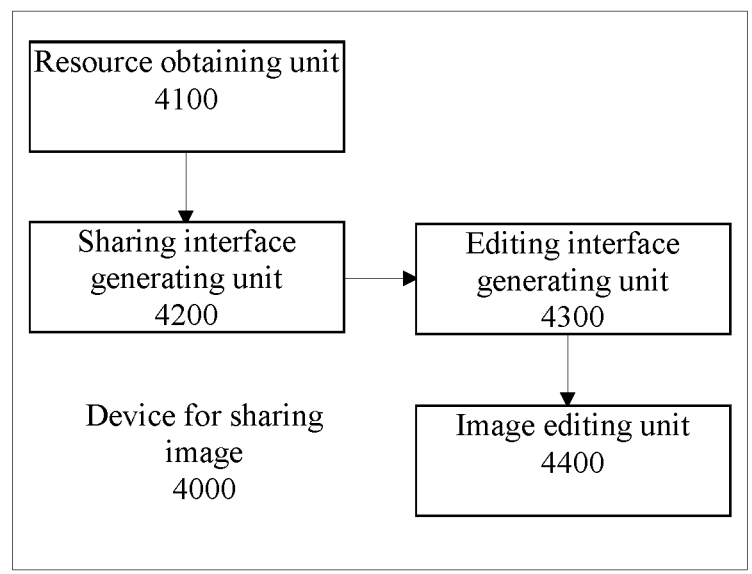
FIG. 4 is a block diagram showing the device for sharing an online image according to one or more embodiments of the present invention.

In this embodiment, an electronic device is further provided, which includes a processor and a memory, in which the memory is configured for storing instructions, and the instructions are used for controlling the processor to operate so as to implement the method for sharing an online image as shown in FIG. 2 or FIG. 3. Specifically, the electronic device may be the electronic device 1000 shown in FIG. 1.

The embodiments of the present invention have been described in detail with reference to the accompanying drawings. According to the embodiments of the present invention, a method, a device, a user terminal, and an electronic device for sharing an online image are provided. By way of obtaining the local resource of an online image, a service of editing and sharing an online image can be provided to the user based on the local resource of the online image, so that the user can directly edit the online image and share the edited image with other users without cumbersome operation, thereby improving the user experience.

A person of ordinary skill in the art should understand that the device for sharing an online image 4000 may be implemented in various manners. For example, the device for sharing an online image 4000 may be implemented by an instruction for configuring a processor. For example, instructions may be stored in a ROM, and when a device is started, the device for sharing an online image 4000 can be implemented by reading the instructions from the ROM into a programmable device. For example, the device for sharing an online image 4000 may be fixed into a dedicated device such as an ASIC. In addition, the device for sharing an online image 4000 may be divided into certain mutually independent units, or they may be combined together for implementation. The device for sharing an online image 4000 may be implemented by using one of the foregoing various manners of implementation or may be implemented by a combination of two or more of the foregoing various manners for implementation.

It is well known to a person of ordinary skill in the art that, with the development of electronic information technologies such as the large scale integrated circuit technology and the tendency of converting software to hardware, it becomes more difficult to clearly define the boundaries between software and hardware in a computer system, which is because that any operation can be implemented either by software or by hardware. The execution of any instruction can be done by hardware or by software as well. Depending on the factors including price, speed, reliability, storage capacity, change cycle and other non-technical factors, the implementation of a certain machine function can be achieved by either a hardware solution or a software solution. Therefore, a person of ordinary skill in the art of electronic information technology knows that a more direct and clear way to describe a technical solution is to describe the various operations in the solution. Knowing the operation to be performed, one skilled in the art can directly design the desired product based on consideration of the non-technical factors.

The present invention can be a system, a method and/or a computer program product. The computer program product may include a computer readable storage medium, and the computer readable storage medium has been loaded with the computer readable program instructions for causing a processor to implement various aspects of the present invention.

The computer-readable storage medium may be a tangible device that can hold and store the instructions for use by the instruction execution device. The computer-readable storage medium may be, but is not limited to, an electrical storage device, a magnetic storage device, an optical storage device, an electromagnetic storage device, a semiconductor storage device, or any suitable combination of the foregoing devices. More specific examples (not an exhaustive list) of computer readable storage media include: a portable computer disk, a hard disk, a random access memory (RAM), a read only memories (ROM), an erasable programmable read only memories (EPROM or flash memory), a static random access memory (SRAM), a portable compact disc read only memory (CD-ROM), a digital versatile disc (DVD), a memory stick, a floppy disk, a mechanical coding device, for example, a card with holes or a recess with raised structures have instructions stored therein, as well as any suitable combination of the above. Computer-readable storage media, as used herein, is not to be construed as an instantaneous signal per se, such as radio waves or other freely propagating electromagnetic waves, electromagnetic waves propagating through waveguides or other transmission media (for example, an optical pulse through an optical fiber cable), or electrical signals transmitted through a wire.

The computer readable program instructions described herein may be downloaded to various computing/processing devices from a computer-readable storage medium or downloaded to an external computer or external storage device over a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in computer-readable storage media in various computing/processing devices.

Computer program instructions for carrying out operations of the present invention may be in the forms of assembly instructions, instruction set architecture (ISA) instructions, machine instructions, machine dependent instructions, microcode, firmware instructions, status setting data, or the source code or object code written with one programming language or a combination of a few programming language, in which the programming language can be, such as Smalltalk, C and the like, as well as conventional procedural programming languages such as the "C" language or similar programming languages. The computer-readable program instructions may be executed entirely on the user's computer, partly on the user's computer, as a stand-alone software package, partly on the user's computer and partly on a remote computer, or entirely on the remote computer or server. In the case of a remote computer, the remote computer may be connected to the user's computer through any kind of network, including a local area network (LAN), a wide area network (WAN), or may be connected to an external computer (for example, via an Internet connection through a service of an Internet service provider). In some embodiments of the present invention, electronic circuits, such as programmable logic circuits, field programmable gate arrays (FPGAs), or programmable logic arrays (PLA), can be personalized by utilizing status information of computer readable program instructions, the foregoing circuit can execute computer readable program instructions, thereby implementing various aspects of the present invention.

Various aspects of the present invention are described herein with reference to the flow chart illustrations and/or block diagrams of methods, devices (systems), and computer program products in accordance with one or more embodiments of the present invention. It should be understood that each block in the flow chart illustrations and/or block diagrams, as well as combinations of the blocks in the flow chart illustrations and/or block diagrams, can be implemented by computer readable program instructions.

These computer readable program instructions may be provided to a processor of a general purpose computer, special purpose computer, or other programmable data processing apparatus to produce a machine; such that the instructions, when executed by the processor of a computer or other programmable data processing apparatus, generate the devices for implementing the function/action specified in one or more blocks in the flow chart and/or block diagram. Alternatively, the computer readable program instructions may be stored in a computer readable storage medium that cause the computer, the programmable data processing apparatus, and/or other devices to function in a particular manner such that the computer readable medium having instructions stored thereon includes a product, which includes instructions which implement various aspects of the functions/actions specified in one or more blocks in the flow chart and/or block diagram.

The computer readable program instructions may also be loaded onto a computer, other programmable data processing apparatus, or other device to cause execution of a series of operational steps on the computer, other programmable data processing apparatus, or other devices to produce a computer implemented process, such that the instructions which are executed on the computer, other programmable data processing apparatus, or other devices are able to execute the functions/actions specified in one or more of the blocks in the flow chart and/or block diagram.

The flow chart and block diagrams in the figures illustrate the architecture, functionality, and operation of possible implementations of systems, methods, and computer program products according to one or more embodiments of the present invention. In this regard, each block of the flow chart or block diagram may represent a module, a program section, or a portion of an instruction that contains one or more executable instructions for implementing a specified logic function. In some alternative implementations, the functions labeled in the blocks may occur in an order other than as noted in the figures. For example, two consecutive blocks may in fact be executed substantially in parallel, and sometimes they may be executed in a reverse order, depending on the specific function involved. It is also to be noted that each block of the block diagrams and/or flow chart, and combinations of blocks in the block diagrams and/or flow chart, can be implemented by special purpose hardware-based systems that perform the specified functions or actions, or may be implemented using a combination of dedicated hardware and computer instructions. It is well known to a person of ordinary skill in the art that the implementation by hardware, the implementation by software, and the combination by software and hardware are all equivalent.

The various embodiments of the present invention have been described above. However, the foregoing description is exemplary, not exhaustive, and is not intended to be limited to the disclosed embodiments. Many modifications and variations will be apparent to a person of ordinary skill in the art without departing from the scope and spirit of the provided embodiments of the present invention. The terminology used herein was chosen to best explain the principles of the embodiments, the practical application or improvements to the technology available on the market, or to enable a person of ordinary skill in the art to understand the embodiments disclosed herein. The scope of the invention is defined by the appended claims.

What is claimed is:

1. A computer-implemented method comprising:
   in response to receiving a request for sharing an online image triggered by a press on the online image through a touch screen display, obtaining, by a user terminal, a unique image identifier of the online image, the user terminal comprising an application cache and a system cache different from the application cache;
   obtaining, by the user terminal, a local resource of the online image to be shared by at least:
      determining that the local resource of the online image is not stored in the application cache by querying in the application cache according to the unique image identifier, and
      in response to determining that the local resource of the online image is not stored in the application cache, querying in the system cache different from the application cache of the user terminal according to the unique image identifier; and
   generating, by the user terminal, a sharing setting interface for a user to set for at least one of editing the online image and then sharing the online image, or directly sharing the online image.

2. The computer-implemented method according to claim 1, wherein the computer-implemented method further comprises:
   when the user sets for sharing the online image after editing, generating an image editing interface for the user to enter an editing instruction, wherein the editing instruction comprises at least one of adding personalized icons or adding personalized tags; and
   in response to the editing instruction, editing based on the local resource of the online image stored in the system cache different from the application cache of the user terminal, so as to generate a corresponding image for sharing by the user.

3. The computer-implemented method according to claim 1, wherein obtaining the local resource of the online image to be shared further comprises:
   in response to determining that the local resource of the online image is not found in the system cache of the user terminal, obtaining a network resource of the online image;
   saving, by the user terminal, the network resource in the system cache of the user terminal to be a corresponding local resource; and
   generating, by the user terminal, a corresponding unique image identifier for the corresponding local resource.

4. The computer-implemented method according to claim 1, wherein obtaining the unique image identifier of the online image comprises:
   treating with a Message-Digest Algorithm 5 (MD5) according to a Uniform Resource Locator (URL) of the online image to generate the unique image identifier of the online image.

5. An electronic device, wherein the electronic device comprises a processor and a memory, wherein the memory is configured for storing instructions, and the instructions are used for controlling the processor to operate, so as to execute the computer-implemented method according to claim 1.

6. The computer-implemented method according to claim 1, wherein the computer-implemented method further comprises:
   in response to detecting the press on the online image through the touch screen display, triggering the request for sharing the online image.

7. The computer-implemented method according to claim 1, wherein the sharing setting interface comprises a creative sharing button and a picture sharing button, wherein the creative sharing button is configured to trigger an editing interface prior to sharing the online image, wherein the picture sharing button is configured to trigger directly sharing the online image.

8. A device for sharing an image, wherein the device comprises:
   a resource obtaining unit being configured for, in response to a request for sharing an online image triggered by a press on the online image through a touch screen display:
      obtaining a unique image identifier of the online image, and
      obtaining a local resource of the online image to be shared by at least:
         determining that the local resource of the online image is not stored in an application cache of the device by querying in the application cache according to the unique image identifier, and
         in response to determining that the local resource of the online image is not stored in the application cache, querying in a system cache of the device that is different from the application cache of the device according to the unique image identifier; and a sharing interface generating unit being configured for generating a sharing setting interface for a user to set for at least one of editing and then sharing the online image, or directly sharing the online image.

9. The device according to claim 8, wherein the device further comprises:

an editing interface generating unit being configured for, when the user sets for sharing the online image after editing, generating an image editing interface for the user to enter an editing instruction, wherein the editing instruction comprises at least one of adding personalized icons or adding personalized tags; and an image editing unit being configured for, in response to the editing instruction, editing based on the local resource of the online image stored in the system cache different from the application cache of the device, so as to generate a corresponding image for sharing by the user.

10. A user terminal, wherein the user terminal comprises at least the device for sharing the image according to claim 8.

11. The device according to claim 8, wherein the resource obtaining unit is further configured for, in response to detecting the press on the online image through the touch screen display, triggering the request for sharing the online image.

12. The device according to claim 8, wherein the sharing setting interface comprises a creative sharing button and a picture sharing button, wherein the creative sharing button is configured to trigger an editing interface prior to sharing the online image, wherein the picture sharing button is configured to trigger directly sharing the online image.

* * * * *